(12) United States Patent
Kim

(10) Patent No.: US 11,929,476 B2
(45) Date of Patent: Mar. 12, 2024

(54) BATTERY COOLING APPARATUS FOR ELECTRIC VEHICLE AND METHOD OF MANUFACTURING SAME

(71) Applicant: HYUNDAI MOBIS Co., Ltd., Seoul (KR)

(72) Inventor: Hwa Sung Kim, Pyeongtaek-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 240 days.

(21) Appl. No.: 17/527,722

(22) Filed: Nov. 16, 2021

(65) Prior Publication Data

US 2022/0158267 A1    May 19, 2022

(30) Foreign Application Priority Data

Nov. 16, 2020   (KR) .................. 10-2020-0153196

(51) Int. Cl.
| | | |
|---|---|---|
| *H01M 10/62* | (2014.01) | |
| *B60K 1/04* | (2019.01) | |
| *H01M 10/625* | (2014.01) | |
| *H01M 10/6556* | (2014.01) | |
| *B60K 1/00* | (2006.01) | |

(52) U.S. Cl.
CPC .............. *H01M 10/625* (2015.04); *B60K 1/04* (2013.01); *H01M 10/6556* (2015.04); *B60K 2001/005* (2013.01); *H01M 2220/20* (2013.01)

(58) Field of Classification Search
CPC ............. H01M 10/625; H01M 10/623; H01M 10/627; H01M 10/6556; H01M 10/6557; H01M 10/6554; H01M 10/655; H01M 2220/20; B60K 1/04; B60K 2001/005
See application file for complete search history.

(56) References Cited

U.S. PATENT DOCUMENTS

| | | | | |
|---|---|---|---|---|
| 11,139,515 | B2* | 10/2021 | Yang ................. | H01M 10/6553 |
| 2016/0036102 | A1* | 2/2016 | Suzuki ............. | H01M 10/6554 |
| | | | | 429/120 |
| 2016/0297320 | A1 | 10/2016 | Legot et al. | |
| 2019/0252655 | A1* | 8/2019 | Zimmermann ......... | B64G 1/42 |

FOREIGN PATENT DOCUMENTS

| | | |
|---|---|---|
| DE | 10 2013 225 628 A1 | 6/2014 |
| DE | 10 2016 201 726 A1 | 8/2017 |
| KR | 10-1563405 B1 | 10/2015 |
| KR | 10-1844818 B1 | 5/2018 |

\* cited by examiner

*Primary Examiner* — Raymond Alejandro
(74) *Attorney, Agent, or Firm* — NSIP Law

(57) ABSTRACT

Disclosed are battery cooling apparatus for electric vehicle, method of manufacturing, and an insulator structure for the apparatus including an insulator having a side wall of the insulator define an upper open part, a tube inserted into the upper open part of the insulator, and a gap filler disposed in a space between an upper surface of the tube and the battery cell, wherein the side wall comprises an inner inclined surface inclined inward and a tube accommodation part formed in an inner surface of the side wall to accommodate an outer part of the tube, and a gap filler application space is formed between the battery cell and the tube, when the tube is inserted between the tube accommodation part of the insulator and an inner bottom surface of the insulator, and a top of the side wall being located higher than the upper surface of the tube.

15 Claims, 5 Drawing Sheets

BATTERY COOLING APPARATUS FOR ELECTRIC VEHICLE AND METHOD OF MANUFACTURING SAME

CROSS-REFERENCE TO RELATED APPLICATIONS

This application claims the benefit under 35 U.S.C. § 119(a) of Korean Patent Application No. 10-2020-0153196, filed on Nov. 16, 2020 in the Korean Intellectual Property Office, the entire disclosure of which is incorporated herein by reference for all purposes.

BACKGROUND

1. Field

The following description relates to a water cooling type or refrigerant type battery cooling apparatus that cools a battery of an electric vehicle using a cooling fluid.

2. Discussion of Related Art

In recent years, the supply of electric vehicles that drive motors using batteries is increasing. The batteries are important components that determine lifetimes and mileages of the electric vehicles. Such batteries generate heat during charging and discharging and require cooling to a predetermined temperature. Currently, an air cooling type using air, a water cooling type using cooling water, and a refrigerant type using a refrigerant are used as such cooling methods. In a cooling method using a cooling fluid, such as the water cooling type or the refrigerant type, a battery cooling apparatus having a cooling passage is mounted in a lower end surface of a battery pack to cool the batteries while the batteries are charged or discharged.

The concept and main configuration of the battery cooling apparatus according to the related art are illustrated in FIGS. 1A (front view) and 1B (plan view). A coolant or a cooling fluid (refrigerant or cooling water) flows in a tube 10 below a battery cell 30 to exchange heat with a cooling/heating target (that is, the battery cell 30). In/out pipes 12 and 14 are passages through which the cooling fluid is introduced into and discharged from the tube 10. A header 20 connects a plurality of tubes 10 so that the cooling fluid introduced into and discharged from the in/out pipes 12 and 14 flows through the tubes 10.

In addition, although not illustrated in FIGS. 1A and 1B (however, as illustrated in FIG. 2), an insulator that insulates the tube 10 below the battery cell 30 from external elements, an elastic support that is located on a lower surface of the insulator to support the insulator and to increase surface adhesion between the tube 10 and the battery cell 30, and a pipe connector for assembling the in/out pipes 12 and 14 and the header 20 are added.

In this way, a tube-type battery cooling apparatus according to the related art roughly includes the tube 10, the insulator, and the elastic support, and a thermal interface material (TIM) is attached to an upper surface of the tube 10 and disposed between the tube 10 and the battery cell 30 to cool the battery cell 30 through the heat transfer between the battery cell 30 and the tube 10. The TIM is used to increase a surface adhesion force between the tube 10 and the battery cell 30 and to achieve electrical insulation. The TIM has a pad type and liquid type gap filler.

When the pad-type TIM is used, the tube 10 is supported with a constant force by the elastic support connected to a bottom surface of the tube 10 for uniform surface adhesion between the tube 10 and the battery cell 30, and the insulator is interposed between the tube 10 and the elastic support to insulate the tube 10. When a gap filler that is the liquid type TIM is used, a separate structure is required so that the gap filler is cured in a state in which a constant thickness is maintained after application.

In the tube-type battery cooling apparatus according to the related art, since a flat surface of the tube is required when the TIM is used, the area of the TIM is increased more than necessary, and thus a weight thereof increases. Further, when the gap filler is used as the TIM, a separate spread plate should be used, and thus there is a risk that more of the filler is used than necessary. Thus, in the current tube-type battery cooling apparatus, when the gap filler is applied, the elastic support is not maintained in the constant thickness, and thus a separate configuration is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for cooling a batter cell of an electric vehicle, the apparatus including an insulator having an upper open part, and a side wall of the insulator define the upper open part, a tube inserted into the upper open part of the insulator, and a gap filler disposed in a space between an upper surface of the tube and the battery cell, wherein the side wall comprises an inner inclined surface inclined inward and a tube accommodation part formed in an inner surface of the side wall and below the inner inclined surface, the tube accommodation part being configured to accommodate an outer part of the tube, and wherein a gap filler application space is formed between the battery cell and the tube, in response to the tube being inserted between the tube accommodation part of the insulator and an inner bottom surface of the insulator, and a top of the side wall being located higher than the upper surface of the tube.

A compression material may be attached to an upper surface of the side wall.

The compression material may be attached to the upper surface of the side wall by one of bonding, fitting, or simultaneous molding with the insulator.

The battery cooling apparatus may include an excess gap filler discharge hole formed in the side wall, the excess gap filler discharge hole being configured to allow the gap filler to pass through an exterior of the insulator.

The battery cooling apparatus may include a condensed water passage formed in the inner bottom surface of the insulator and through which condensed water generated in the tube flows.

The battery cooling apparatus may include a condensed water discharge hole formed in the condensed water passage, the condensed water discharge hole being configured to discharge condensed water externally.

In another general aspect, there is provided an insulator of a battery cooling apparatus for an electric vehicle, the insulator including a tube for cooling a battery cell and the insulator configured to insulate the tube, wherein the insulator comprises a side wall defining an upper open part of the insulator, and the side wall comprises an inner inclined surface inclined inward and a tube accommodation part formed in an inner surface of the side wall and below the inner inclined surface, the tube accommodation part being configured to accommodate an outer part of the tube, and wherein a gap filler application space is formed between the battery cell and the tube, in response to the tube being accommodated between the tube accommodation part and an inner bottom surface of the insulator, and a top of the side wall being located higher than the upper surface of the tube.

A compression material may be attached to an upper surface of the side wall.

The compression material may be attached to the upper surface of the side wall of the upper open part of the insulator by one of bonding, fitting, or simultaneous molding with the insulator.

In another general aspect, there is provided a method of manufacturing a battery cooling apparatus for a battery cell of an electric vehicle, the method including forming an insulator having an upper open part and a side wall defining the upper open part, the side wall including an inner inclined surface inclined inward and a tube accommodation part formed in an inner surface below the inner inclined surface and being configured to accommodate an outer part of the tube, inserting the tube in the tube accommodation part formed between the inner inclined surface and an inner bottom surface of the insulator to form a gap filler application space in an upper surface of the tube, applying a gap filler to the gap filler application space, and assembling a battery on the upper surface of the tube to which the gap filler is applied.

The forming of the insulator may include attaching a compression material to an upper surface of the side wall.

The attaching of the compression material may include attaching the compression material to the upper surface of the side wall by one of bonding, fitting, or simultaneous molding with the insulator.

The forming of the insulator may include forming an excess gap filler discharge hole in the side wall to allow the gap filler to pass through an exterior of the insulator.

The forming of the insulator may include forming a condensed water passage in the inner bottom surface of the insulator and through which condensed water generated in the tube flows.

The forming of the insulator may include a condensed water discharge hole formed in the condensed water passage, and the condensed water discharge hole being configured to discharge the condensed water externally.

Other features and aspects will be apparent from the following detailed description, the drawings, and the claims.

Figure 1A:
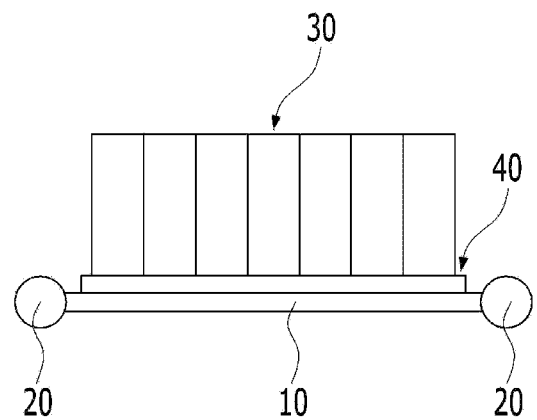
FIGS. 1A and 1B are a front view and a plan view illustrating a concept and a main configuration of a battery cooling apparatus according to a related art.
Figure 1B:
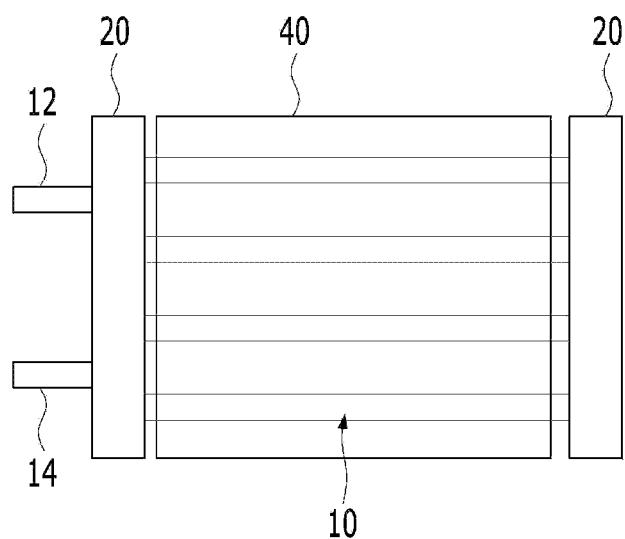

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

Advantages and features of the present disclosure and a method of achieving the advantages and the features will become apparent with reference to embodiments described below in detail together with the accompanying drawings. However, the present disclosure is not limited to the embodiments described below and may be implemented in various different forms. The embodiments are merely provided to completely disclose the present disclosure and to completely inform the scope of the disclosure of those skilled in the art to which the present disclosure pertains, but the present disclosure is defined by the appended claims. Further, terms used in the present specification are intended to describe the embodiments and are not intended to limit the present disclosure. In the present specification, a singular form also includes a plural form unless specifically mentioned. Further, terms ("comprise, comprising, and the like") used herein do not exclude the presence or addition of one or more other components, steps, operations, and/or elements other than components, steps, operations, and/or elements mentioned above. Hereinafter, exemplary embodiments of the present disclosure will be described in detail with reference to the accompanying drawings. In description of the embodiments, when a detailed description of related widely known configurations or functions makes the subject matter of the present disclosure unclear, the detailed description will be omitted.

Figure 2:
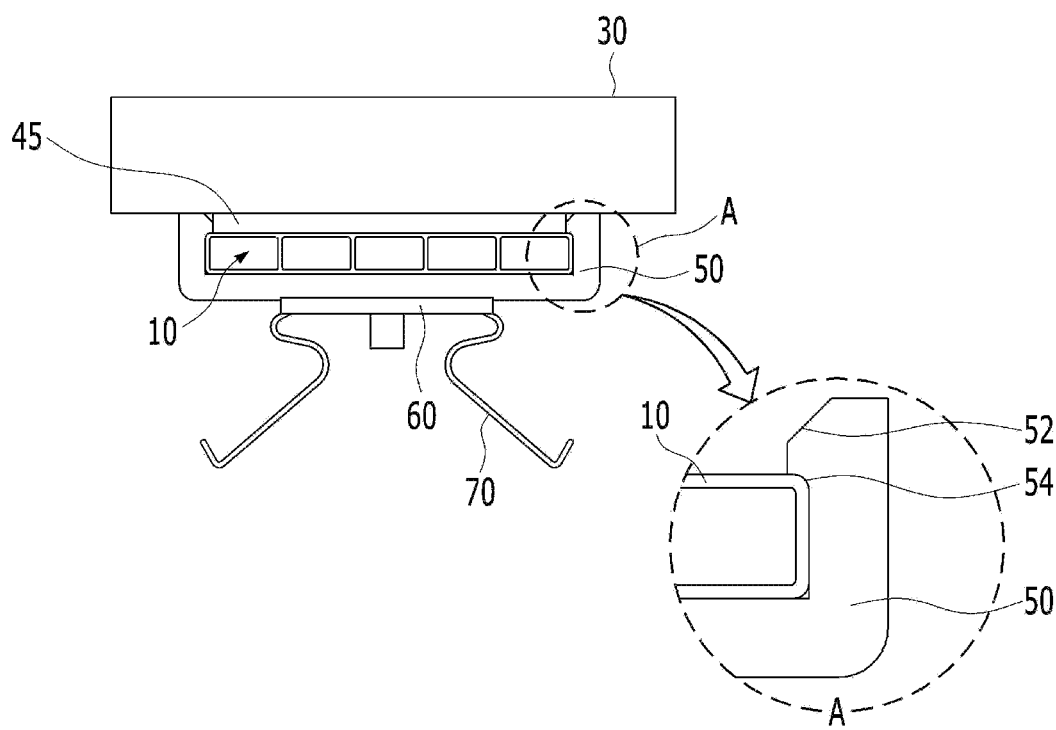
FIG. 2 is a view illustrating a configuration of a tube-type battery cooling apparatus according to the present disclosure.

FIG. 2 is a view illustrating a configuration of a tube-type battery cooling apparatus according to the present disclosure.

A tube 10 in contact with a battery cell 30 or a cooling fin (not illustrated) is assembled so that a lower surface thereof is covered with an insulator 50 for heat insulation from the outside. The insulator 50 has a shape having an upper open part having an open upper side and thus the tube 10 is seated on the insulator 50 through the upper open part. A lower surface of the insulator 50 is connected to an elastic support 70 through a connector 60. When the elastic support 79 is mounted on an external component (a housing, a vehicle body, or the like), the elastic support 70 pushes the insulator 50 assembled with the tube 10 upward with a constant force, thereby increasing a surface adhesion force between the battery cell 30 and the tube 10. Meanwhile, after the tube 10 is seated through the upper open part of the insulator 50, a liquid gap filler 45 is applied or a pad-type thermal interface material (TIM) is inserted between an upper surface of the tube 10 and a lower surface of the battery cell 30. thereby further increasing the surface adhesion force.

As illustrated in an enlarged view on a right side of FIG. 2, an edge surface of a side wall defining the upper open part of the insulator 50 forms an inner inclined surface 52 inclined inward, and a tube accommodation part 54 accommodating an outer part of the tube 10 is formed in an inner surface below the inner inclined surface 52. The tube accommodation part 54 is recessed inward so that the tube 10 is accommodated between the inner inclined surface 52 of the side wall of the upper open part of the insulator 50 and an inner bottom surface of the insulator 50 (see FIG. 6 for a state in which the tube 10 is assembled with the insulator 50).

When the tube 10 is assembled inside the insulator 50 with such a structure, the side wall of the upper open part of the insulator 50 is located higher than the upper surface of the tube 10. Accordingly, when the liquid gap filler 45 is applied to the upper surface of the tube 10, the gap filler 45 may be cured between the upper surface of the tube 10 and the lower surface of the battery cell 30 while being maintained in a constant thickness. Further, even when not a liquid pad-type TIM but a solid pad-type TIM is attached, the side wall of the upper open part of the insulator 50 may serve as a guide for the TIM.

Figure 3:
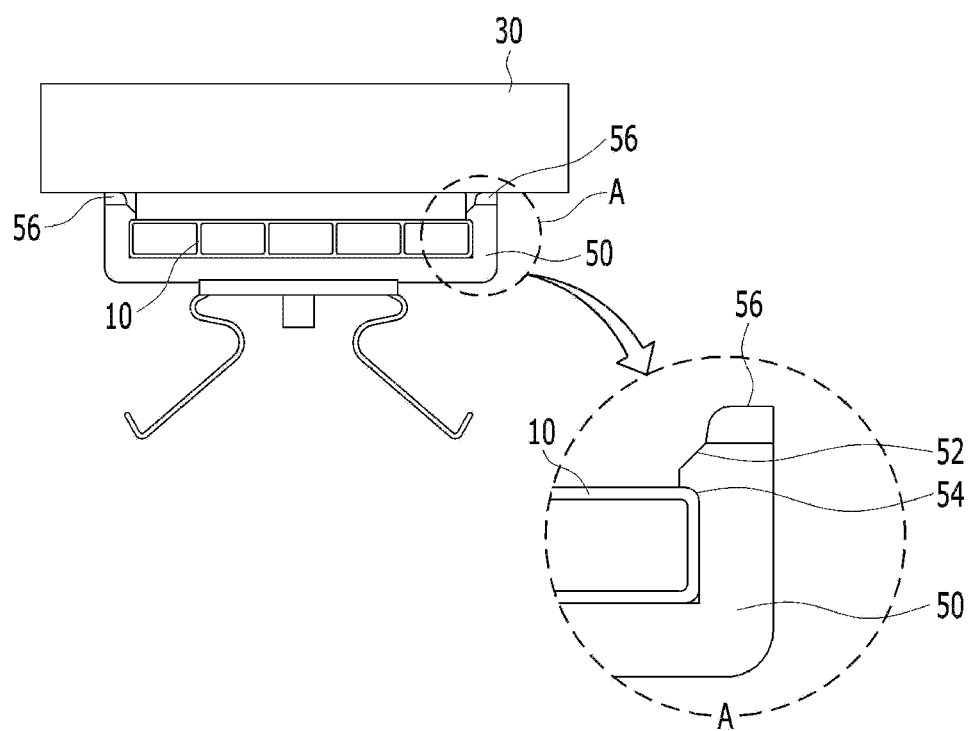
FIG. 3 is a diagram illustrating a configuration of a tube-type battery cooling apparatus according to another embodiment of the present disclosure.

FIG. 3 illustrates that a compression material 56 is attached to an upper surface of the side wall of the upper open part of the insulator 50, that is, a surface in contact with the lower surface of the battery cell 30. The compression material 56 serves as a buffer for absorbing an assembly step of the battery cell 30 or the cooling fin (not illustrated) (see FIG. 4) and allows the gap filler 45 to maintain a constant thickness after the gap filler 45 is cured.

Figure 4:
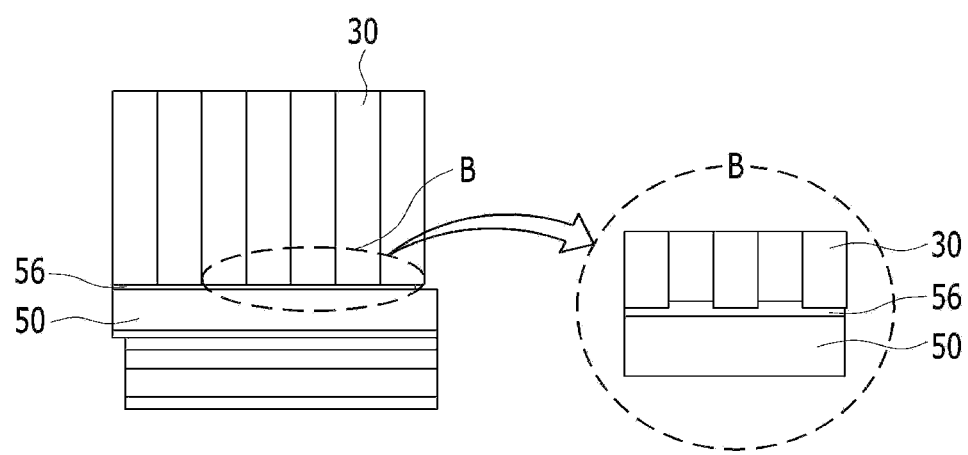
FIG. 4 is a diagram illustrating an assembly step absorption principle of a compression material (56).

FIG. 4 illustrates a principle that the compression material 56 serves as a buffer for absorbing the assembly step of the battery cell 30. As illustrated in FIG. 4, the compression material 56 absorbs the positional deviation between respective cells constituting the battery cell 30, and thus the side wall of the insulator 50 may come into contact with the battery cell 30 with a constant force on an entirety of an upper side wall of the insulator 50.

Figure 5A:
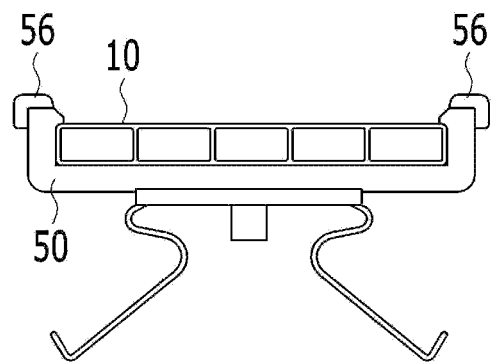
FIGS. 5A-5C show diagrams illustrating various examples of the compression material (56) attached to an upper surface of a side wall of an upper open part of an insulator (50).
Figure 5B:
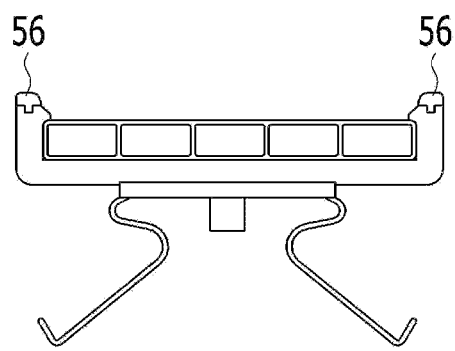
Figure 5C:
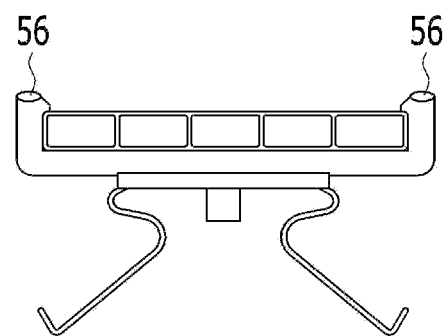

The compression material 56 may be adhesively attached to the upper surface of the side wall defining the upper open part or may be fastened to the upper surface of the side wall through a fitting structure in a predetermined manner. Alternatively, the compression material 56 may be manufactured at the same time as the insulator 50 by a method such as insert injection during injection molding of the insulator 50. FIGS. 5A-5C illustrate examples of various attachment/formation methods of the compression material 56.

FIG. 5A illustrates a state in which the compression material 56 is attached to the upper portion of the side wall of the upper open part of the insulator 50 from an outer side to an upper side of the upper portion in an L shape, and FIG. 5B illustrates that a groove is formed in the upper surface of the side wall of the upper open part of the insulator 50 and the compression material 56 is fitted and attached to the groove. Further, FIG. 5C illustrates that the compression material 56 is simultaneously insert-injected and molded on the upper surface of the side wall of the upper open part of the insulator 50 during the injection molding of the insulator 50.

Figure 6:
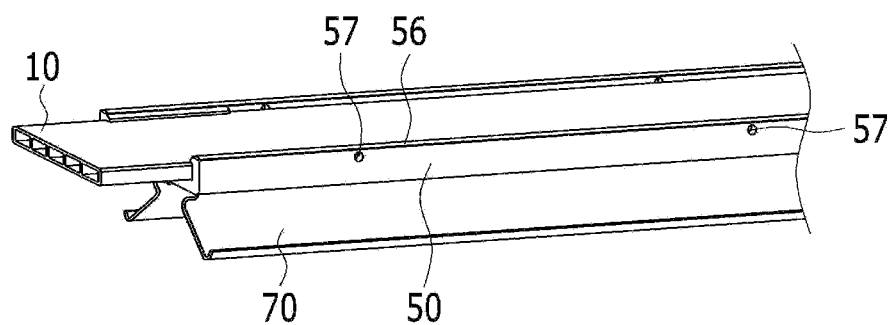
FIG. 6 is a perspective view illustrating a state in which a tube (10) is assembled with the insulator (50).

FIG. 6 is a perspective view illustrating a state in which the tube 10 is assembled inside the insulator 50. FIG. 6 also illustrates an excess gap filler discharge hole 57 formed in the side wall of the upper open part of the insulator 50 to allow the liquid gap filler 45 to pass through the exterior of the insulator 50. Even when an excessive amount of the gap filler 45 is applied to the upper surface of the tube 10, since the excess gap filler 45 is discharged through the gap filler discharge hole 5 when the battery cell 30 is assembled, a constant amount of the gap filler 45 always remains and is cured between the tube 10 and the battery cell 30. At least one gap filler discharge hole 57 may be formed to discharge the excess gap filler.

Figure 7:
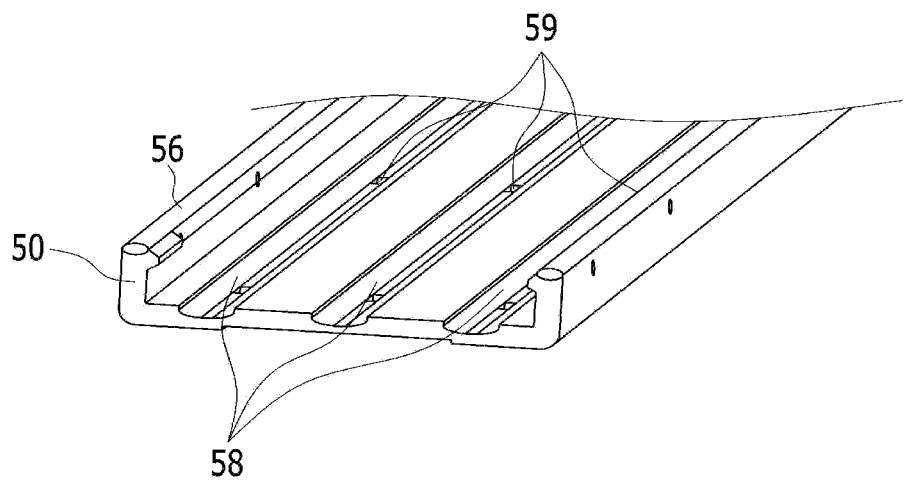
FIG. 7 is a configuration diagram of an inner bottom surface of the insulator (50).

FIG. 7 illustrates the inner bottom surface of the insulator 50 before the tube 10 is assembled in order to describe components formed on the inner bottom surface of the insulator 50. A condensed water passage 58, through which condensed water generated by a cooling operation of the tube 10 flows, is formed in the inner bottom surface of the insulator 50. Further, a condensed water discharge hole 59 through which the condensed water is discharged externally is formed in a bottom surface of the condensed water passage 58. That is, the condensed water generated in the tube 10 falls down, is collected and flows in the condensed water passage 58, and is discharged externally through the condensed water discharge hole 59. In order to increase the effect of the condensed water discharge action, a plurality of condensed water passages 58 and a plurality of condensed water discharge holes 59 may be installed.

Described above are a battery cooling apparatus for an electric vehicle, a method of manufacturing the same, and an insulator structure for a battery cooling apparatus which, in a system for cooling a battery using a cooling fluid, increase surface adhesion between a tube and a battery cell so as to increase the cooling efficiency and prevent the degradation of the battery.

Described above are a battery cooling apparatus including a configuration in which a gap filler is applied between a tube and a battery cell and is cured and a constant interval is then maintained between the tube and the battery cell and a configuration in which a compression material is attached to an insulator so that the assembly deviation between the insulator and the battery cell is absorbed, a method of manufacturing the same, and an insulator used therein.

According to the present disclosure, by improving a structure of an insulator assembled with a tube, a side wall of an upper open part of the insulator is configured to accommodate a liquid gap filler, and thus a constant amount of the gap filler can be easily applied to a required part. Further, a compression material is attached to an upper surface of the side wall, thereby absorbing the assembly step of a battery cell and thus increasing the surface adhesion properties. In this way, the gap filler is applied only to the required part, and thus the application amount can be reduced and the weight of the entire cooling apparatus can be reduced. Further, a configuration for discharging condensed water is added to the insulator, and thus problems caused by the condensed water can be easily solved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for cooling a battery cell of an electric vehicle, the apparatus comprising:
    an insulator having an upper open part, and a side wall of the insulator define the upper open part;
    a tube inserted into the upper open part of the insulator; and
    a gap filler disposed in a space between an upper surface of the tube and the battery cell,
    wherein the side wall comprises an inner inclined surface inclined inward and a tube accommodation part formed in an inner surface of the side wall and below the inner inclined surface, the tube accommodation part being configured to accommodate an outer part of the tube, and
    wherein a gap filler application space is formed between the battery cell and the tube, in response to the tube being inserted between the tube accommodation part of the insulator and an inner bottom surface of the insulator, and a top of the side wall being located higher than the upper surface of the tube.

2. The battery cooling apparatus of claim 1, wherein a compression material is attached to an upper surface of the side wall.

3. The battery cooling apparatus of claim 2, wherein the compression material is attached to the upper surface of the side wall by one of bonding, fitting, or simultaneous molding with the insulator.

4. The battery cooling apparatus of claim 1, further comprising an excess gap filler discharge hole formed in the side wall, the excess gap filler discharge hole being configured to allow the gap filler to pass through an exterior of the insulator.

5. The battery cooling apparatus of claim 1, further comprising a condensed water passage formed in the inner bottom surface of the insulator and through which condensed water generated in the tube flows.

6. The battery cooling apparatus of claim 5, further comprising a condensed water discharge hole formed in the condensed water passage, the condensed water discharge hole being configured to discharge condensed water externally.

7. An insulator of a battery cooling apparatus for an electric vehicle, the insulator comprising:
    a tube for cooling a battery cell and the insulator configured to insulate the tube;
    wherein the insulator comprises a side wall defining an upper open part of the insulator, and the side wall comprises an inner inclined surface inclined inward and a tube accommodation part formed in an inner surface of the side wall and below the inner inclined surface, the tube accommodation part being configured to accommodate an outer part of the tube, and
    wherein a gap filler application space is formed between the battery cell and the tube, in response to the tube being accommodated between the tube accommodation part and an inner bottom surface of the insulator, and a top of the side wall being located higher than the upper surface of the tube.

8. The insulator of claim 7, wherein a compression material is attached to an upper surface of the side wall.

9. The insulator of claim 8, wherein the compression material is attached to the upper surface of the side wall of the upper open part of the insulator by one of bonding, fitting, or simultaneous molding with the insulator.

10. A method of manufacturing a battery cooling apparatus for a battery cell of an electric vehicle, the method comprising:
    forming an insulator having an upper open part and a side wall defining the upper open part, the side wall comprising an inner inclined surface inclined inward and a tube accommodation part formed in an inner surface below the inner inclined surface and being configured to accommodate an outer part of the tube;
    inserting the tube in the tube accommodation part formed between the inner inclined surface and an inner bottom surface of the insulator to form a gap filler application space in an upper surface of the tube;
    applying a gap filler to the gap filler application space; and
    assembling a battery on the upper surface of the tube to which the gap filler is applied.

11. The method of claim 10, wherein the forming of the insulator comprises attaching a compression material to an upper surface of the side wall.

12. The method of claim 11, wherein the attaching of the compression material comprises attaching the compression material to the upper surface of the side wall by one of bonding, fitting, or simultaneous molding with the insulator.

13. The method of claim 10, wherein the forming of the insulator further comprises forming an excess gap filler discharge hole in the side wall to allow the gap filler to pass through an exterior of the insulator.

14. The method of claim 10, wherein the forming of the insulator further comprises forming a condensed water passage in the inner bottom surface of the insulator and through which condensed water generated in the tube flows.

15. The method of claim 14, wherein the forming of the insulator further comprises a condensed water discharge hole formed in the condensed water passage, and the condensed water discharge hole being configured to discharge the condensed water externally.

* * * * *